US010850689B2

(12) United States Patent
Komaromi et al.

(10) Patent No.: US 10,850,689 B2
(45) Date of Patent: Dec. 1, 2020

(54) CIRCUIT ARRANGEMENT FOR SUPPLYING AN ELECTRICAL VEHICLE COMPONENT PART OF A MOTOR VEHICLE WITH A DANGEROUS CONTACT OPERATING VOLTAGE AND MOTOR VEHICLE AND METHOD

(71) Applicant: CONTINENTAL AUTOMOTIVE GMBH, Hannover (DE)

(72) Inventors: Patrick Komaromi, Vienna (AT); Aurel-Vasile Neic, Kasten bei Boeheimkirchen (AT)

(73) Assignee: Continental Automotive GmbH, Hannover (DE)

(*) Notice: Subject to any disclaimer, the term of this patent is extended or adjusted under 35 U.S.C. 154(b) by 63 days.

(21) Appl. No.: 16/197,666

(22) Filed: Nov. 21, 2018

(65) Prior Publication Data

US 2019/0152412 A1    May 23, 2019

(30) Foreign Application Priority Data

Nov. 21, 2017 (DE) .......................... 10 2017 220 749

(51) Int. Cl.
*B60L 7/00*    (2006.01)
*B60R 16/03*    (2006.01)
(52) U.S. Cl.
CPC ................... *B60R 16/03* (2013.01)
(58) Field of Classification Search
CPC .................................................. B60R 16/03
See application file for complete search history.

(56) References Cited

U.S. PATENT DOCUMENTS 9,278,619 B2    3/2016 Stadler et al.
2001/0052760 A1    12/2001 Amano et al.
2009/0256704 A1* 10/2009 Ieda .................... G08B 13/1481
340/540

(Continued)

FOREIGN PATENT DOCUMENTS

DE          19724356 C1    5/1998
DE     102008060040 A1    11/2009
(Continued)

*Primary Examiner* — Alfonso Perez Borroto
*Assistant Examiner* — Esayas G Yeshaw
(74) *Attorney, Agent, or Firm* — Laurence A. Greenberg; Werner H. Stemer; Ralph E. Locher

(57) ABSTRACT

A circuit arrangement supplies an electrical vehicle component part of a motor vehicle with an operating voltage, which has a voltage value that is greater than a predetermined limit value for dangerous contact. The circuit arrangement has a source circuit for generating the operating voltage and two line elements for transmitting the operating voltage to the vehicle component part. A reference contact is provided for connecting the circuit arrangement to a reference-ground potential. The source circuit is configured, in order to generate the operating voltage, to generate a first component voltage between the first line element and the reference contact and a second component voltage between the second line element and the reference contact. The difference between the component voltages corresponds to the operating voltage and the component voltages with respect to the reference contact have a voltage value lower than the limit value.

16 Claims, 4 Drawing Sheets

(56) References Cited

U.S. PATENT DOCUMENTS

| | | | | |
|---|---|---|---|---|
| 2014/0055283 A1* | 2/2014 | Ching | .................... | G01D 4/002 340/870.02 |
| 2014/0077592 A1* | 3/2014 | Koch | ...................... | B60L 58/20 307/9.1 |
| 2015/0303737 A1* | 10/2015 | Steinbuchel, IV | .... | B60L 3/0069 320/109 |
| 2016/0352277 A1* | 12/2016 | Sagawa | .................... | B60L 50/15 |
| 2017/0305297 A1* | 10/2017 | Kim | ................... | H01M 8/04302 |

FOREIGN PATENT DOCUMENTS

| | | |
|---|---|---|
| DE | 102011006518 A1 | 10/2012 |
| EP | 2841292 B1 | 6/2016 |

\* cited by examiner

CIRCUIT ARRANGEMENT FOR SUPPLYING AN ELECTRICAL VEHICLE COMPONENT PART OF A MOTOR VEHICLE WITH A DANGEROUS CONTACT OPERATING VOLTAGE AND MOTOR VEHICLE AND METHOD

CROSS-REFERENCE TO RELATED APPLICATION

This application claims the priority, under 35 U.S.C. § 119, of German application DE 10 2017 220 749.3, filed Nov. 21, 2017; the prior application is herewith incorporated by reference in its entirety.

BACKGROUND OF THE INVENTION

Field of the Invention

The invention relates to a circuit arrangement for supplying an electrical vehicle component part of a motor vehicle with an operating voltage, which has a voltage value that is greater than a predetermined limit value. The limit value defines a dangerous contact voltage. In the circuit arrangement, a source circuit is connected to the vehicle component part by means of two line elements. The invention also includes a motor vehicle and a method for operating the circuit arrangement.

DC voltages over 60 volts and AC voltages over 30 volts (likely to be over 50 volts in the future) are considered to be dangerous contact voltages, which means considerable additional outlay for contact protection, fault diagnosis, identification, development and documentation compared to the voltages that are currently prevalent in the automotive field. However, there is interest in using operating voltages above the dangerous contact limit value in a motor vehicle. An example of this is what is known as a switchable glazing unit or a dimmable glass unit, in which, through applying an AC voltage to two contact layers, the degree of optical transmissivity or dimness of a layer located between said two contact layers can be changed or adjusted. Examples of a layer of this kind are respectively a polymer dispersed liquid crystal (PDLC) and a suspended particle device (SPD). The AC voltage that is to be applied to control the layer between the two contact layers typically has an RMS value greater than 30 volts (AC voltage). Today, the use of a switchable glazing unit therefore requires the described additional outlay on account of the use of an operating voltage above the limit value for dangerous contact voltages.

The danger that comes from the dangerous contact operating voltage generally results from the fact that a person can experience a dangerous contact voltage even upon contact with one of the two line elements via which the operating voltage is transmitted and upon simultaneous contact with the ground potential of the motor vehicle. In order to prevent this, galvanic isolation is known, by way of which the two line elements for transmitting the operating voltage are galvanically isolated from the ground potential of the motor vehicle. If a person makes contact with one of the two line elements at the same time as with the ground potential, this does not produce a voltage above the described limit value. An alternative solution is known from EP 2 841 292 B1, corresponding to U.S. Pat. No. 9,278,619. The document describes that the dangerous contact operating voltage for an electrical load is generated directly at said load so that the supply lines thus have to transmit only a supply voltage below the limit value. Within the electrical load, the critical, dangerous contact operating voltage can then be generated directly in the load, for example, by way of a transformer.

However, such a solution constitutes a significant restriction of flexibility, in particular in the case of a confined installation space or in the case of moving parts, like in the event of a switchable glazing unit, for example for a sunroof of the motor vehicle.

Both the galvanic isolation and the direct generation of the dangerous contact operating voltage within the electrical load generally require additional outlay in terms of parts, which is disadvantageous for the production costs and the provision complexity.

SUMMARY OF THE INVENTION

The invention is based on the object of providing protection against a dangerous contact operating voltage in a motor vehicle using simple technical measures, without losing the flexibility with respect to installation space and mobility for a vehicle component part that is to be supplied with power.

This object is achieved by the subjects of the independent patent claims. The invention also comprises further developments, which are described by the subclaims, the following description and the figures.

The invention provides a circuit arrangement, which is configured to supply an electrical vehicle component part of a motor vehicle with an operating voltage. The vehicle component part can be or have, for example, the described glazing unit. The operating voltage has a voltage value that is greater than a predetermined limit value for dangerous contact. The limit value results, in particular, in accordance with standard ISO 6469, preferably for the voltage classes A or B1 in accordance with ISO/DIS 6469-3:2017(E). The limit value is thus, in particular, 60 V or lies in a range of from 60 V to 75 V in the case of DC (DC—direct current) and/or DC voltage or the limit value is 30 V or lies in a range of from 30 V to 50 V for the root mean square value of the voltage in the case of AC (AC—alternating current) and/or in the case of AC voltage. The RMS value is to be understood here as meaning the quadratic mean of the operating voltage (RMS—root mean square). The RMS value of a voltage can also be provided with the unit Veff. According to this definition, the RMS value of a temporally variable operating voltage is that DC voltage that transforms the same power (heat per time period) in an ohmic resistor on average over time. The circuit arrangement has a source circuit for generating the operating voltage and two line elements for transmitting the operating voltage to the vehicle component part. The two line elements can in each case be, for example, a wire or a cable. In the circuit arrangement, the dangerous contact operating voltage is thus transmitted from the source circuit via the two line elements to the vehicle component part. In other words, the source circuit does not have to be integrated in the vehicle component part, as a result of which the described restriction of the mobility of the vehicle component part is prevented.

If the electrical insulation in one of the line elements is now damaged and if a person makes contact with this line element together with the ground potential of the motor vehicle, it is necessary to prevent a voltage greater than the limit value from being dropped across the person in this case. To this end, the invention provides at the circuit arrangement a reference contact for connecting the circuit arrangement to a reference-ground potential of an environment of the circuit arrangement. The reference-ground potential can be, for example, the ground potential. In other words, the circuit arrangement is then electrically connected to the reference-ground potential, that is to say, in particular, to the ground potential, by means of the reference contact of said circuit arrangement. The source circuit is configured, in order to generate the operating voltage, to generate a first component voltage between a first of the line elements and the reference contact. Furthermore, the source circuit is configured to generate a second component voltage between the second of the line elements and the reference contact. The difference between the component voltages corresponds here to the operating voltage. In other words, the operating voltage is thus generated between the two line elements, wherein, however, the respective potential of the line elements with respect to the reference-ground potential is not free but is determined by means of the two component voltages. In other words, the reference-ground potential is always located between the potential of the two line elements. However, this results in the first component voltage and the second component voltage each having a respective voltage value with respect to the reference contact, which voltage value is lower in terms of magnitude than said limit value. That is to say that if, for example, an operating voltage with an RMS value of 50 volts (AC voltage) is provided between the line elements, there can be provision for the operating voltage to be effectively divided into two component voltages of 25 volts (AC voltage) each. If a person now makes contact in the case of insulation damage with one of the two line elements and at the same time the reference-ground potential as well, only the respective component voltage applied between the line element and the reference-ground potential is produced and consequently not a voltage that lies above the limit value.

The invention produces the advantage that neither of the two line elements has the specific outlay for contact protection, fault diagnosis, identification, development and/or documentation necessary for line elements that lead a voltage above the dangerous contact limit value with respect to the ground potential of the motor vehicle. Instead, only those component voltages that lie below the limit value are produced in the circuit arrangement up to the vehicle component part in each case with respect to the reference-ground potential. Nevertheless, the circuit arrangement can be used to generate and transmit an operating voltage, which has a voltage value above the limit value.

The invention also includes embodiments that provide additional advantages.

One embodiment makes provision for the two component voltages to each be half of the operating voltage. This produces the advantage that the voltage value of the component voltages is minimized.

One embodiment makes provision for the source circuit to be configured to generate each of the two component voltages as a DC voltage. As a result of this, a series circuit composed of light-emitting diodes can be supplied with an operating voltage, for example. One embodiment makes provision for the source circuit to be configured to generate the component voltages as a periodically variable voltage. In particular, a periodically switched DC voltage can be provided, that is to say the voltage is switched alternately between a minimum value and a maximum value. As an alternative thereto, an AC voltage alternating periodically by the reference-ground potential can be provided. The AC voltage can have a sinusoidal profile, for example. In the case of periodic switching of a DC voltage, provision can be made, in particular, for edge steepness of the lateral profile of the voltage to be limited during switchover. In particular, a limited curvature can also be provided so that no sudden profiles or corners are produced in the time profile of the voltage. To this end, a low-pass filter can be used, for example. The use of a periodically variable voltage has the advantage that a switchable glazing unit can be operated or adjusted directly using the circuit arrangement.

One embodiment makes provision for the source circuit, in order to respectively generate the two component voltages, to have two component circuits that can be operated independently of one another to generate respectively one of the component voltages. The source circuit is configured in this case to adjust the voltage value of the operating voltage to a setpoint value signaled by an actuating signal by actuating at least one of the component circuits (that is to say one or both component circuits). The actuating signal can be given to the circuit arrangement from outside or externally, for example. In this embodiment, the operating voltage is thus generated indirectly by virtue of the two component circuits each generating one of the component voltages between one of the line elements and the reference-ground potential. The operating voltage is then produced as the difference between the two component voltages. This embodiment has the advantage that the limit value for the voltage value is not exceeded anywhere even when the operating voltage is generated within the two component circuits.

One embodiment makes provision here for at least one of the component circuits (that is to say one or both component circuits) to be formed on the basis of a DC/DC converter (DC voltage converter) or a DC/AC converter (inverter). This produces the advantage that the amplitude of each component voltage can be adjusted in a targeted manner by configuring the respective converter.

One embodiment makes provision for the source circuit to be configured, in order to adjust the voltage value of the operating voltage to the setpoint value, to adjust a respective amplitude of the respective component voltage and/or a phase offset between the two component voltages. The adjustment of the phase offset has the advantage that the two component voltages can be kept symmetrical with respect to the reference-ground potential. In particular, only the actuation of one of the component circuits is necessary in order to adjust or to change the phase offset.

In order to be able to switch off the operating voltage during adjustment of the phase offset, one embodiment makes provision for the source circuit to be configured, in order to interrupt the operating voltage, to output the two component voltages in phase. In other words, the component voltages are generated but the difference between them is 0 volts on account of them being in phase, which then corresponds to the operating voltage. In other words, the component voltages do not have to be switched off in order to adjust the operating voltage to 0 volts.

This is advantageous, in particular, in an embodiment in which at least one further electrical vehicle component part is provided, wherein the further electrical vehicle component part is connected to the source circuit by means of one of the two line elements described already and by means of an additional further line element. That is to say, for each additional further vehicle component part, only one further line element has to be provided. For each further vehicle component part, only one further component circuit (for generating a further component voltage) is also provided in each case. This produces the advantage that the supply of each further vehicle component part with an operating voltage requires in each case only one additional line element and one additional component voltage.

An alternative embodiment makes provision for the source circuit not to have two independent component circuits but to be configured to generate the operating voltage between the line elements independently of the reference-ground potential. That is to say, in other words, the operating voltage is in this case generated directly between the line elements. The two component voltages are adjusted here with respect to the reference-ground potential by an impedance network, that is to say a plurality of interconnected impedances. An impedance network of this kind can be formed, for example, on the basis of a circuit for a voltage divider, wherein the reference contact can be connected to the reference-ground potential in the series circuit of two resistance elements of the voltage divider at the connecting contact thereof. This embodiment has the advantage that two component circuits are not necessary to generate the operating voltage.

One embodiment makes provision for the two line elements to be designed as wires or cables. The line elements preferably have a length of more than 20 cm. In particular, a length of more than 50 cm can be provided. In this embodiment, the vehicle component part is arranged spaced apart from the source circuit by more than 20 cm. In other words, the vehicle component part is connected to the source circuit not only by means of a circuit board, for example. Instead, the line elements are provided in a flexible manner in the form of wires or cables, for example. The source circuit on the one hand and the vehicle component part on the other hand can thus be installed at different locations in the motor vehicle and the distance between them can be bridged by means of the line elements. The vehicle component part can in this case be mounted, in particular, in a movable manner relative to the source circuit. This is provided, in particular, in combination with busbars and/or sliding contacts and/or open contacts, which are connected, for example, by closing a hatch, for example a tailgate. The electrical connection is then provided by said elements.

One embodiment makes provision for the source circuit to have a supply input for receiving a supply voltage from an electrical on-board power supply system of the motor vehicle. The source circuit is configured here to generate the operating voltage from the supply voltage, wherein the supply input and the vehicle component part are galvanically connected by means of the source circuit and the line elements. In other words, a continuous galvanic connection is produced between the vehicle component part on the one hand and the on-board power supply system on the other hand. This produces the advantage that the circuit outlay for providing galvanic isolation is no longer required.

The source circuit is thus, in particular, not a generator. Instead, the source circuit is itself supplied with a supply voltage from, for example, an electrical on-board power supply system of the motor vehicle by means of a supply terminal or a supply input. A supply voltage received by means of the supply terminal can be a DC voltage, for example. The supply voltage can have a voltage value in a range of from 10 volts to 50 volts. The source circuit generates the described operating voltage for the vehicle component part from the supply voltage.

One embodiment makes provision for the vehicle component part to be a switchable glazing unit, in which an optical transmissivity or transparency of a layer arranged between two transparent contact layers is dependent on the voltage value of the operating voltage in the manner described above. The transparent contact layers can each be formed from indium tin oxide (ITO), for example. The layer arranged between the contact layers can have the PDLC or SPD, for example. The first of the contact layers is galvanically connected to the first line element and the second of the contact layers is galvanically connected to the second line element. As a result of this, the optical transmissivity or transparency of the layer can advantageously be controlled directly by the source circuit.

The circuit arrangement according to the invention is provided for a motor vehicle. The invention also accordingly contains a motor vehicle having at least one circuit arrangement according to the invention. The motor vehicle according to the invention is designed, in particular, as an automobile, preferably as a passenger vehicle or truck, or as an agricultural machine.

The operation of the circuit arrangement according to the invention produces the method according to the invention. The method serves to supply an electrical vehicle component part of a motor vehicle with an operating voltage. The operating voltage has, in the described manner, a voltage value that is greater than the predetermined limit value for dangerous contact. The circuit arrangement provides a source circuit for generating the operating voltage and two line elements for transmitting the operating voltage to the vehicle component part. To provide the operating voltage, the source circuit generates the described first component voltage between the first line element and a reference contact, which is connected to the reference-ground potential of the environment of the circuit arrangement, that is to say, for example, to the ground potential of the motor vehicle, and generates a second component voltage between the second line element and the reference contact. The difference between the component voltages corresponds in the described manner to the operating voltage and the first component voltage and the second component voltage each have a respective voltage value with respect to the reference contact, which voltage value is lower than the limit value. In other words, the potential difference between each of the line elements on the one hand and the reference-ground potential on the other hand is given by the respective component voltage.

The invention also includes embodiments of the method according to the invention having features that have already been described in connection with the embodiments of the circuit arrangement according to the invention. For this reason, the corresponding embodiments of the method according to the invention are not described here again.

The invention also includes the combinations of the described embodiments.

Other features which are considered as characteristic for the invention are set forth in the appended claims.

Although the invention is illustrated and described herein as embodied in a circuit arrangement for supplying an electrical vehicle component part of a motor vehicle with a dangerous contact operating voltage and motor vehicle and method, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

Figure 3:
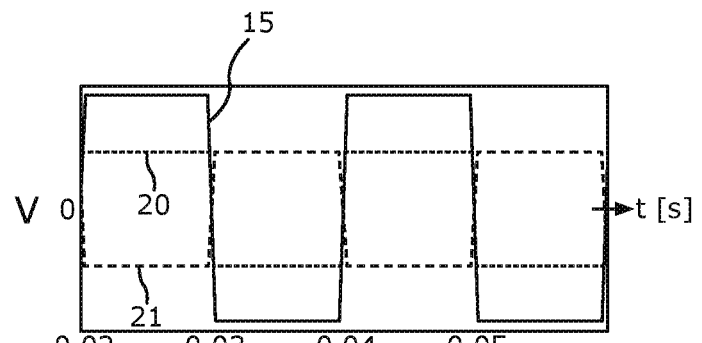
Figure 4:
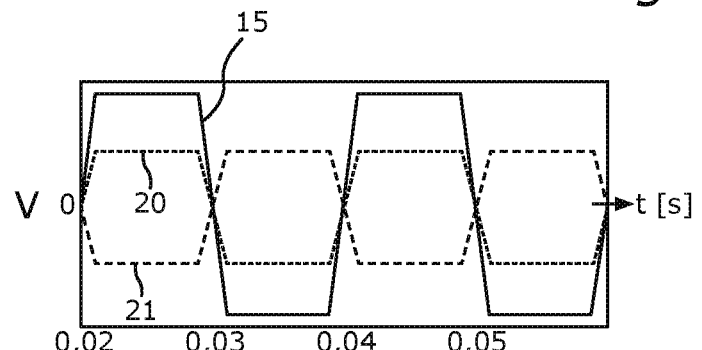
Figure 5:
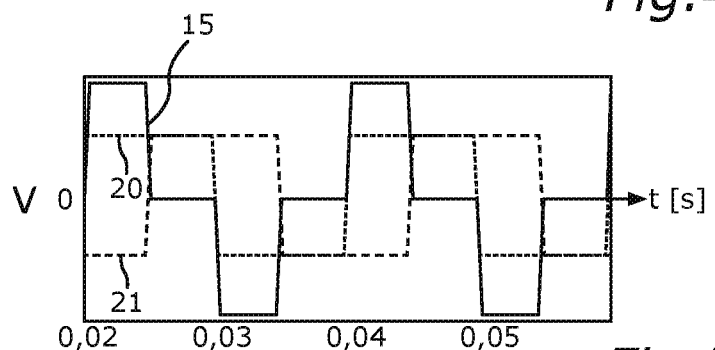
Figure 6:
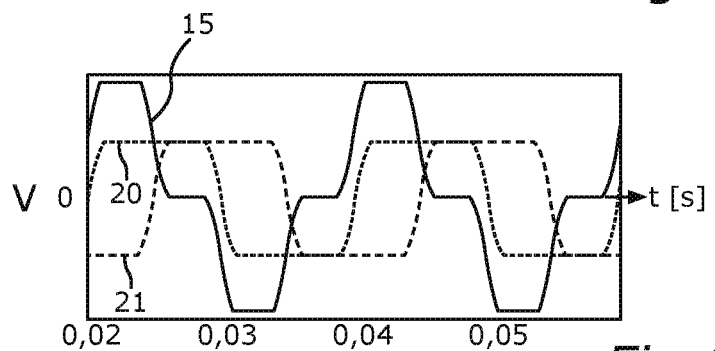

FIG. is a schematic illustration of a second embodiment of the circuit arrangement according to the invention;

FIG. 3 is a graph showing schematized profiles of voltages, as can be generated by the circuit arrangement according to the invention;

FIG. 4 is a graph showing schematized alternative profiles of the voltages;

FIG. 5 is a graph showing schematized alternative profiles of the voltages;

FIG. 6 is a graph showing schematized alternative profiles of the voltages; and

Figure 7:
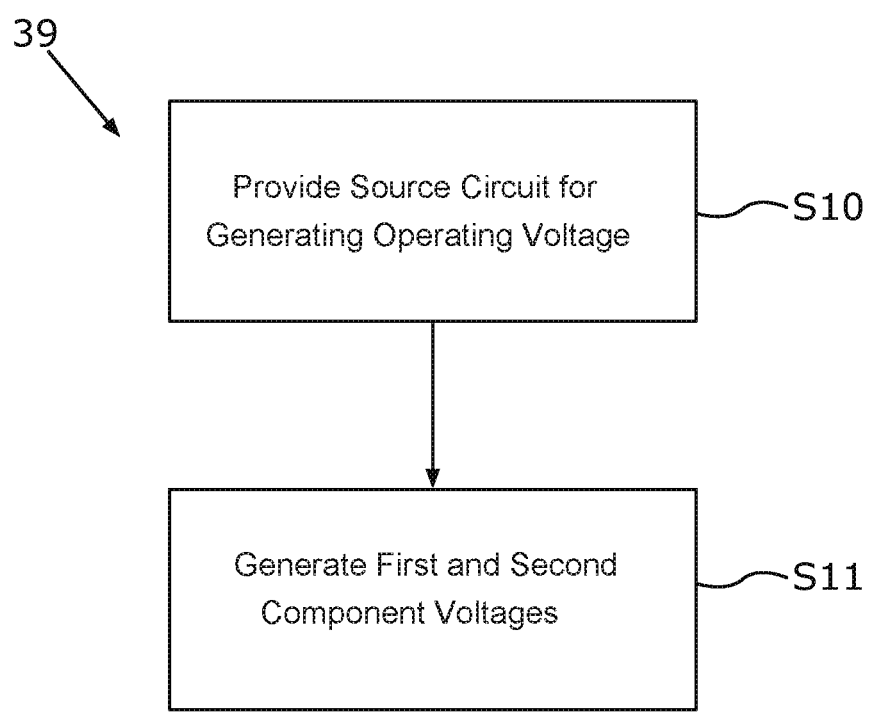

FIG. 7 is a flow diagram for illustrating an embodiment of the method according to the invention.

DETAILED DESCRIPTION OF THE INVENTION

Each exemplary embodiment explained below is a preferred embodiment of the invention. In each exemplary embodiment, the described component parts of the embodiment each represent individual features of the invention which are to be considered independently of one another and which each also develop the invention independently of one another and can therefore also be considered to be a component of the invention, either individually or in a combination other than that shown. Furthermore, further features of the invention that have already been described can also be added to the described embodiment.

In the figures, functionally identical elements are in each case provided with the same reference signs.

Figure 1:
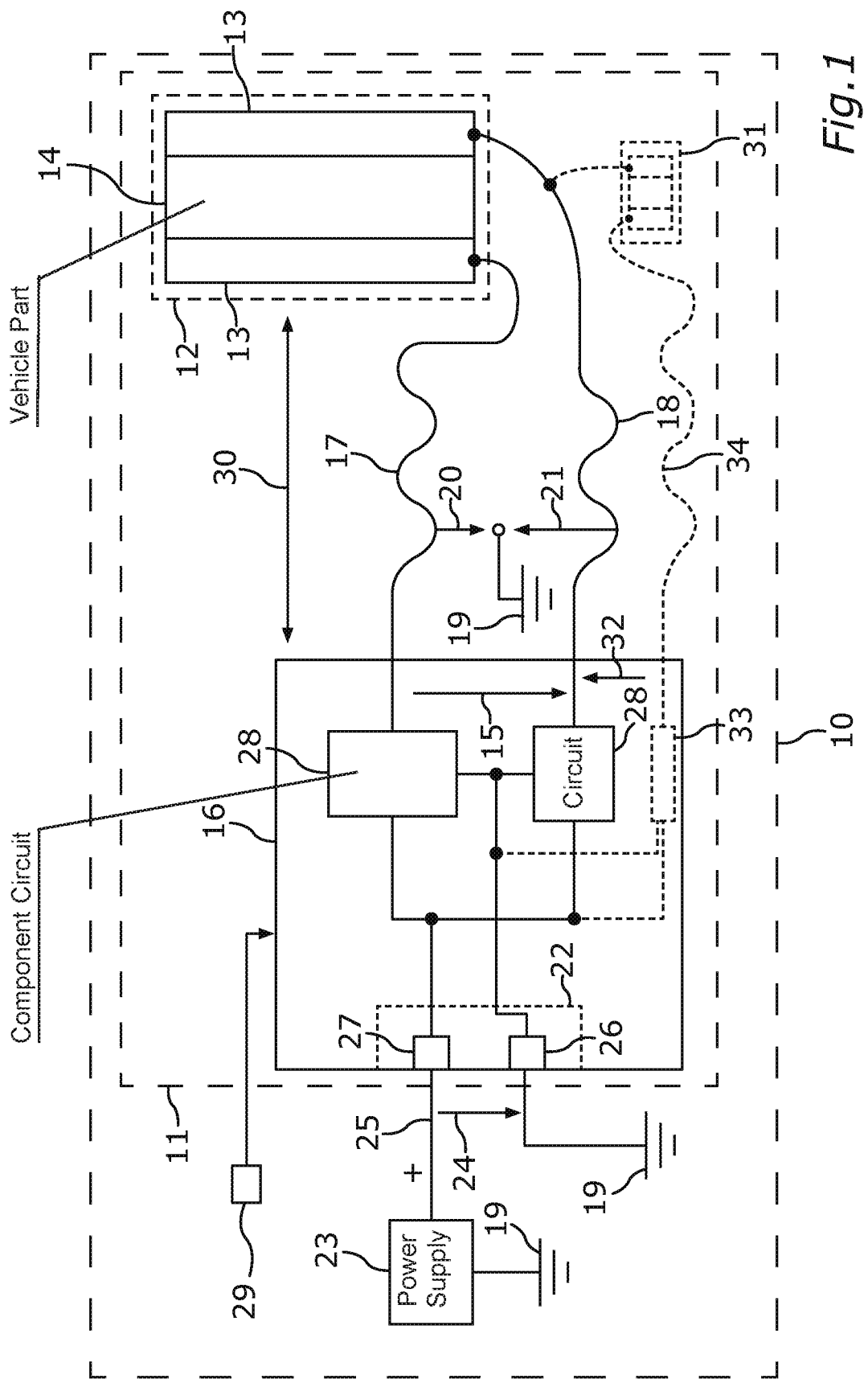
FIG. 1 is a schematic illustration of an embodiment of a motor vehicle according to the invention having a first embodiment of a circuit arrangement according to the invention.

Referring now to the figures of the drawings in detail and first, particularly to FIG. 1 thereof, there is shown a motor vehicle 10. The motor vehicle 10 can be, for example, an automobile, for example a passenger vehicle or truck, or an agricultural machine. The motor vehicle 10 can have a circuit arrangement 11, by way of which a vehicle component part 12 can be operated. The vehicle component part 12 can be a constituent part of the circuit arrangement 11. The vehicle component part 12 can be, for example, a switchable glazing unit. As a switchable glazing unit, the vehicle component part 12 can have two transparent contact layers 13, between which a layer 14, the optical transmissivity of which can be switched or adjusted and which is made, for example, of SPD or PDLC, can be provided. The switchable glazing unit can be, for example, a constituent part of a sunroof of the motor vehicle 10. To adjust the optical transmissivity, the circuit arrangement 11 can provide a temporally periodically variable voltage as the operating voltage 15. The operating voltage 15 can be generated by a source circuit 16 of the circuit arrangement 11. The operating voltage 15 can be transmitted from the source circuit 16 via two electrical line elements 17, 18 to the vehicle component part 12. For example, each of the line elements 17, 18 can be galvanically connected to each one of the contact layers 13 of an electrically switchable glazing unit. For the operation of the vehicle component part 12, the operating voltage 15 has to have a voltage value that lies above a limit value of, for example, 60 volts (DC voltage and/or DC) or (in particular in the case of a switchable glazing unit) above 30 volts (AC voltage and/or AC). In general, one of the limit values already described can be provided for the operating voltage 15, which is denoted in the following text by U, for example in accordance with the voltage classes A and B1 of the standard ISO/DIS 6469-3:2017(E):

Voltage class Limit value
DC in V AC in V (RMS value Veff)
A 0<U≤60 0<U≤30
B1 50<U≤75 30<U≤50.

Nevertheless, each line element 17, 18 has, with respect to a reference-ground potential 19, which can be the ground potential of the motor vehicle 10 here, in each case only one component voltage 20, 21 whose voltage value lies below the limit value.

To this end, a source circuit 16 can be configured as follows.

To generate the operating voltage 15, the source circuit 16 can receive a supply voltage 24, which can be a DC voltage, for example, whose voltage value can lie in a range of from 10 volts to 50 volts, by means of a supply terminal or a supply input 22, for example, from an on-board power supply system 23 of the motor vehicle 10. The supply voltage 24 can be provided between a positive line 25 and the reference-ground potential 19. The supply input 22 can have a reference contact 26 for connection to the reference-ground potential 19. To link the positive line 25, a positive contact 27 can be provided in the supply input 22. According to the embodiment illustrated in FIG. 1, two component circuits 28 can be operated by means of the supply voltage 24. Each component circuit 28 can be a DC/DC converter or a DC/AC converter, for example. Each component circuit 28 is connected to each one of the line elements 17, 18 and generates in the line element 17, 18 the respective component voltage 20, 21 between the linked line element 17, 18 on the one hand and the reference-ground potential 19 on the other hand. The two component circuits 28 are in this case coordinated with one another in such a way that the difference between the component voltages 20, 21 generated by the component circuits is the operating voltage 15.

The voltage value of the operating voltage 15 can be adjustable. To this end, the circuit arrangement 11 can receive a setpoint value 29 for the voltage value of the operating voltage 15 and adjust or control the two component circuits 28 depending on the setpoint value 29. For example, the respective amplitude of the component voltages 20, 21 and/or the phase offset thereof can be adjusted with respect to one another depending on the setpoint value 29. The operating voltage 15 produced between the line elements 17, 18 as a result is transmitted to the vehicle component part 12. In the case of a switchable glazing unit, the operating voltage 15 is then applied between the contact layers 13, as a result of which the degree of optical transmissivity or transparency is produced in the layer 14. By prescribing the setpoint value 29, the optical transmissivity of the switchable glazing unit can therefore be adjusted. In this case, the source circuit 16 and the vehicle component part 12 can be arranged at a distance 30 from one another, which distance can be greater than 20 cm, for example. The connection is effected by means of the line elements 17, 18, which can be flexible. Each line element 17, 18 can be, for example, a wire, preferably having insulation. In this case, the vehicle component part 12 can also be arranged in a movable manner relative to the source circuit 16.

In addition to the vehicle component part 12, a further vehicle component part 31 can be provided, which can likewise be a switchable glazing unit. In order to also supply the further vehicle component part 31 with a further operating voltage 32, two further component circuits 28 are not necessary. Instead, only one single further component circuit 33 for each further vehicle component part 31 and one single further line element 34 are necessary. One of the two other line elements 17, 18 (this is the line element 18 in FIG. 1) and the further line element 34 can then be used. A further component voltage, which is then added together with the component voltage 21 of the line element 18 to form the further operating voltage 32, can be generated by means of the further component circuit 33.

Figure 2:
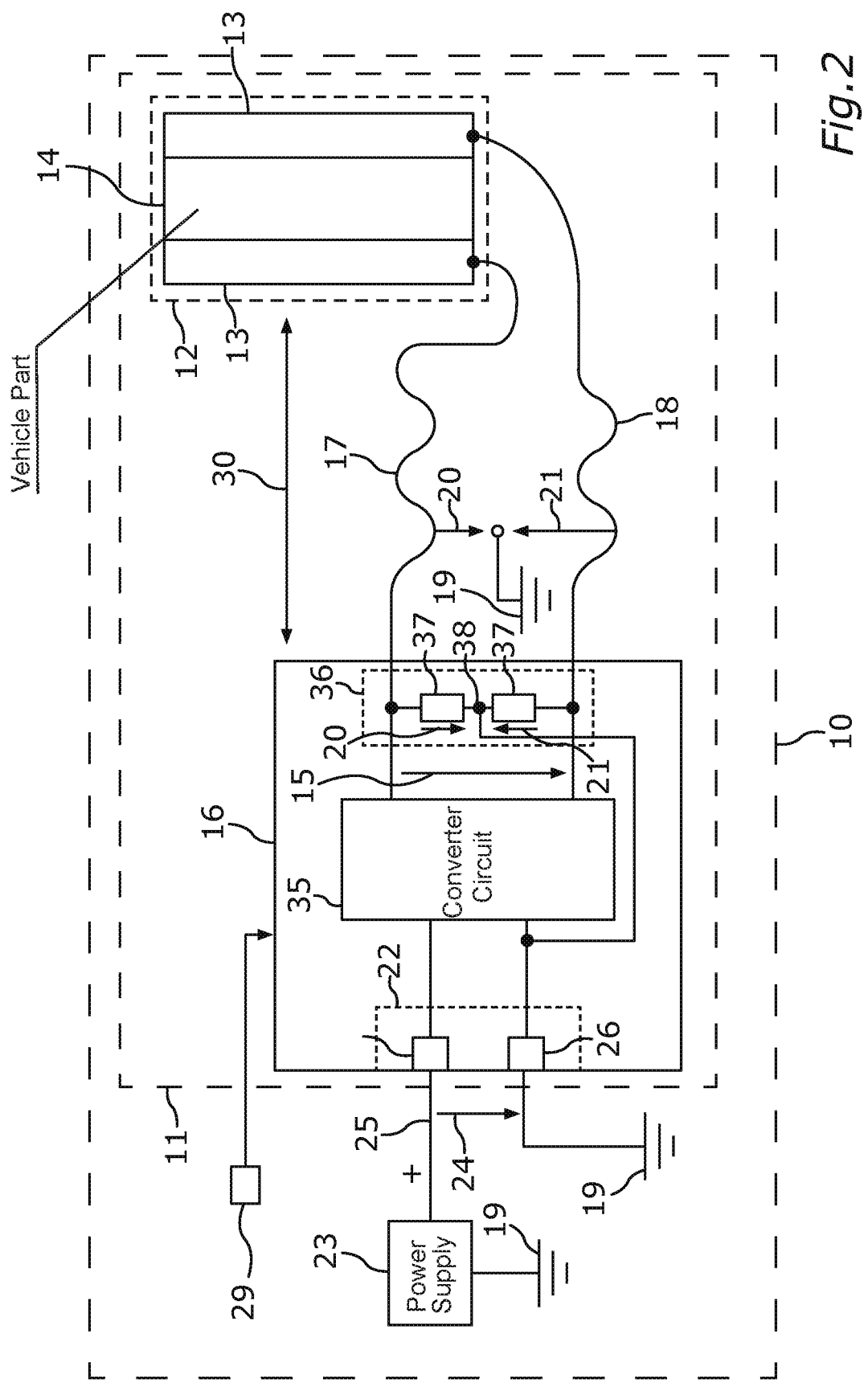

FIG. 2 shows an embodiment in which the operating voltage 15 is generated directly in the source circuit 16 by a single converter circuit 35, for example a DC/DC converter or a DC/AC converter. In order to also adjust the potential of the line elements 17, 18 here with respect to the reference-ground potential 19, provision can be made of an impedance network 36, which can have a voltage divider with two resistance elements 37, for example. The voltage divider connects the two line elements 17, 18. The reference-ground potential 19 can be applied at a connecting contact 38, which electrically connects the two resistance elements 37, in the voltage divider. As a result of this, the respective component voltage 20, 21 is also produced between the line elements 17, 18 on the one hand and the reference-ground potential 19 on the other hand.

FIG. 3, FIG. 4, FIG. 5 and FIG. 6 illustrate how the voltage value of the operating voltage 15 can be adjusted by means of the two component voltages 20, 21. In each case, the time profile of the voltage value V over time t (in seconds) is illustrated.

FIG. 3 illustrates how the component voltages 20, 21 can be designed as a switched DC voltage or square-wave AC voltage. In particular, the two component voltages 20, 21 are switched in antiphase. The two component voltages 20, 21 are, in particular, half as great as the operating voltage 15 in terms of magnitude. The difference between the component voltages 20, 21 results in the operating voltage 15.

FIG. 4 illustrates an embodiment in which, in the component voltages 20, 21, in contrast to FIG. 3, an edge steepness and a curvature of the time profile of the component voltages 20, 21 are limited to a predetermined maximum value.

The frequency of the voltages can lie in a range of from 0 Hz to 20 kHz.

FIG. 5 illustrates how the voltage value of the operating voltage 15 can be reduced in comparison with the antiphase component voltages of FIG. 3 and FIG. 4 by virtue of the phase offset of the component voltages 20, 21 being changed.

FIG. 3 and FIG. 4 show the antiphase case (phase offset of 180 degrees). FIG. 5 shows the case of a phase offset of 90 degrees. FIG. 5 shows in this case the case of FIG. 3 with a changed phase offset.

FIG. 6 shows, in comparison with FIG. 5, the change of the phase offset to 90 degrees for the component voltages of FIG. 4.

FIG. 7 illustrates a method 39, as can be carried out to operate the vehicle component part 12 in the motor vehicle 10. In a step S10, the circuit arrangement 11 and, in particular, the source circuit 16 thereof for generating the operating voltage 15 and the two line elements 17, 18 for transmitting the operating voltage 15 to the vehicle component part 12 are provided.

In a step S11, the source circuit 16 for generating the operating voltage can generate the first component voltage 20 between the first line element 17 and the reference contact 26 and the second component voltage 21 between the second line element 18 and the reference contact 26. In this case, the difference between the line elements 17, 18 is the operating voltage 15 and the first component voltage 20 and the second component voltage 21 each have a respective voltage value with respect to the reference contact 26, which voltage value is lower than said limit value, that is to say, for example, lower than 60 volts or 75 volts (DC voltage and/or DC) or 30 Veff or 50 Veff (AC voltage and/or AC).

The feeding of the vehicle component part 12 is thus effected by two component voltages 20, 21, which, taken individually, are not dangerous contact voltages, that is to say, in particular, are lower than said limit value of 30 Veff AC or 50 Veff AC or 60 V DC or 75 V DC with respect to the vehicle ground or generally the reference-ground potential 19. The operating voltage 15 at the vehicle component part 12 (load) results from the difference between the two component voltages 20, 21 and can be up to double the non-dangerous contact values. For example, two offset, sinusoidal or square-wave AC voltages or a positive and a negative DC voltage could be involved here. Typically, the edges of the square wave here are more or less significantly rounded (limited curvature of the profile), inter alia, in order to prevent EMC problems (EMC—electromagnetic compatibility).

The following examples illustrate the possibilities for the generation of the operating voltage 15:

1 a. Two sinusoidal AC voltages offset by 180° as component voltages of in each case up to 30 Veff (each not dangerous contact voltages individually) result at the load in a sinusoidal AC voltage of up to 60 Veff; the voltage at the load is controlled by means of the amplitudes of the individual voltages.

1 b. Two sinusoidal AC voltages offset by up to 180° of in each case 30 Veff (each not dangerous contact voltages individually) result at the load in a sinusoidal AC voltage of up to 60 Veff; the voltage at the load is controlled by means of the offset of the individual voltages.

2a. Two DC voltages pulsing in a manner offset by 180° of up to positive and negative 60 V (each not dangerous contact voltages individually) result at the load in a square-wave AC voltage of up to 120 Veff; the voltage at the load is controlled by means of the amplitudes of the individual voltages.

2b. Two DC voltages pulsing in a manner offset by up to 180° having positive and negative 60 V (each not dangerous contact voltages individually) result at the load in a pulsed AC voltage of up to 120 Veff; the voltage at the load is controlled by means of the offset of the individual voltages.

The reduction of the outlay for contact protection, fault diagnosis, identification, development and documentation is advantageous.

A galvanic isolation or actuation directly within a glazing unit becomes superfluous.

For an SPD glazing unit, according to one embodiment, an operating voltage with a voltage value of 100 Veff AC can now be provided by virtue of two component voltages of the class B1, that is to say with a voltage value of 50 Veff AC, being used.

Overall, the example shows how the invention makes it possible to provide dangerous contact voltages safely.

The following is a summary list of reference numerals and the corresponding structure used in the above description of the invention:

10 Motor vehicle
11 Circuit arrangement
12 Vehicle component part
13 Contact layer
14 Layer
15 Operating voltage
16 Source circuit
17 Line element
18 Line element
19 Reference-ground potential
20 Component voltage
21 Component voltage 22 Supply input
23 On-board power supply system
24 Supply voltage
25 Positive line
26 Reference contact
27 Positive contact
28 Component circuit
29 Setpoint value
30 Distance
31 Vehicle component part
32 Operating voltage
33 Component circuit
34 Line element
35 Converter circuit
36 Impedance network
37 Resistance element
38 Connecting contact
39 Method
S10-S11 Step

The invention claimed is:

1. A circuit configuration for supplying an electrical vehicle component part of a motor vehicle with an operating voltage, the operating voltage having a voltage value that is greater than a predetermined limit value, the circuit configuration comprising:
a source circuit for generating the operating voltage;
two line elements for transmitting the operating voltage to the electrical vehicle component part;
a reference contact for connecting the circuit configuration to a reference-ground potential of an environment of the circuit configuration; and
said source circuit is configured, in order to generate the operating voltage, to generate a first component voltage between a first line element of said two line elements and said reference contact and a second component voltage between a second line element of said two line elements and said reference contact, a difference between the first and second component voltages corresponds to the operating voltage and the first component voltage and the second component voltage each have a respective voltage value with respect to said reference contact, the respective voltage value is lower in terms of magnitude than the predetermined limit value;
wherein the reference ground potential is between the first component voltage and the second component voltage.

2. The circuit configuration according to claim 1, wherein the first and second component voltages are each half of the operating voltage.

3. The circuit configuration according to claim 1, wherein said source circuit is configured to generate each of the first and second component voltages as a DC voltage or as a periodically variable voltage.

4. The circuit configuration according to claim 1, wherein:
said source circuit has two component circuits that can be operated independently of one another to generate respectively one of the first and second component voltages; and
said source circuit is configured to adjust the voltage value of the operating voltage to a setpoint value signaled by an actuating signal by actuating at least one of said two component circuits.

5. The circuit configuration according to claim 4, wherein at least one of said two component circuits is formed on a basis of a DC/DC converter or a DC/AC converter.

6. The circuit configuration according to claim 4, wherein said source circuit is configured, in order to adjust the voltage value of the operating voltage, to adjust a respective amplitude of the first and second component voltages and/or a phase offset between the first and second component voltages.

7. The circuit configuration according to claim 4, wherein said source circuit is configured, in order to interrupt the operating voltage, to output the first and second component voltages in phase.

8. The circuit configuration according to claim 3, further comprising:
a further line element;
at least one further electrical vehicle component part, said further electrical vehicle component part is connected to said source circuit by means of one of said two line elements and by means of said further line element; and
a further component circuit connected to said further electrical vehicle component part.

9. The circuit configuration according to claim 1, wherein said source circuit has an impedance network and is configured to generate the operating voltage between said two line elements independently of the reference-ground potential and said first and second component voltages are adjusted with respect to the reference-ground potential by means of said impedance network.

10. The circuit configuration according to claim 1, wherein said two line elements are wires or cables and each have a length of more than 20 cm and the electrical vehicle component part is disposed spaced apart from said source circuit at a distance of more than 20 cm.

11. The circuit configuration according to claim 1, wherein said source circuit has a supply input for receiving a supply voltage from an electrical on-board power supply system of the motor vehicle and said source circuit is configured to generate the operating voltage from the supply voltage, wherein said supply input and the electrical vehicle component part are galvanically connected by means of said source circuit and said two line elements.

12. The circuit configuration according to claim 1, wherein the electrical vehicle component part is a switchable glazing unit, in which an optical transmissivity of a layer disposed between two transparent contact layers is dependent on the voltage value of the operating voltage, and a first of the two transparent contact layers is galvanically connected to said first line element and a second of said two transparent contact layers is galvanically connected to said second line element.

13. The circuit configuration according to claim 1, wherein said source circuit is configured to generate each of the first and second component voltages as a DC voltage, as a periodically switched DC voltage or as an AC voltage alternating periodically by the reference-ground potential.

14. A motor vehicle, comprising:
an electrical vehicle component; and
a circuit configuration for supplying said electrical vehicle component part with an operating voltage, the operating voltage having a voltage value that is greater than a predetermined limit value, said circuit configuration containing:
a source circuit for generating the operating voltage;
two line elements for transmitting the operating voltage to said electrical vehicle component part;
a reference contact for connecting said circuit configuration to a reference-ground potential of an environment of said circuit configuration; and
said source circuit configured, in order to generate the operating voltage, to generate a first component voltage between a first line element of said two line elements and said reference contact and a second component voltage between a second line element of said two line elements and said reference contact, a difference between the first and second component voltages corresponds to the operating voltage and the first component voltage and the second component voltage each have a respective voltage value with respect to said reference contact, the respective voltage value being lower in terms of magnitude than the predetermined limit value;

wherein the reference ground potential is between the first component voltage and the second component voltage.

15. A method for supplying an electrical vehicle component part of a motor vehicle with an operating voltage, the operating voltage having a voltage value that is greater than a predetermined limit value, which comprises the steps of:

providing a source circuit for generating the operating voltage and two line elements for transmitting the operating voltage to the electrical vehicle component part by way of a circuit configuration; and generating, via the source circuit for generating the operating voltage, a first component voltage between a first line element of the two line elements and a reference contact, which is connected to a reference-ground potential of an environment of the circuit configuration, and a second component voltage between a second line element of the two line elements and the reference contact, wherein a difference between the first and second component voltages corresponding to the operating voltage and the first component voltage and the second component voltage each have a respective voltage value with respect to the reference contact, the respective voltage value being lower in terms of magnitude than the predetermined limit value;

wherein the reference ground potential is between the first component voltage and the second component voltage.

16. The circuit configuration according to claim 1, wherein the operating voltage is a dangerous contact voltage that is greater than 60 V DC or 30 V AC.

\* \* \* \* \*